United States Patent
Palko et al.

(10) Patent No.: US 12,339,566 B2
(45) Date of Patent: Jun. 24, 2025

(54) ACCESSORY FOR BODY-WORN CAMERA

(71) Applicant: LIGHT ENFORCEMENT, LLC, Marlton, NJ (US)

(72) Inventors: Richard A. Palko, Moorestown, NJ (US); Bryan Haas, Mullica Hill, NJ (US)

(73) Assignee: LIGHT ENFORCEMENT, LLC, Marlton, NJ (US)

( * ) Notice: Subject to any disclaimer, the term of this patent is extended or adjusted under 35 U.S.C. 154(b) by 0 days.

(21) Appl. No.: 18/605,253

(22) Filed: Mar. 14, 2024

(65) Prior Publication Data

US 2024/0329494 A1 Oct. 3, 2024

Related U.S. Application Data

(60) Provisional application No. 63/456,650, filed on Apr. 3, 2023.

(51) Int. Cl.
*G03B 15/00* (2021.01)
*G03B 15/02* (2021.01)
*G03B 17/56* (2021.01)

(52) U.S. Cl.
CPC .......... *G03B 15/02* (2013.01); *G03B 17/561* (2013.01)

(58) Field of Classification Search
CPC .............................. G03B 15/02; G03B 17/561
See application file for complete search history.

(56) References Cited

U.S. PATENT DOCUMENTS

| | | | |
|---|---|---|---|
| 7,568,813 B2 * | 8/2009 | Barker | F21L 4/04 362/108 |
| 8,917,187 B2 * | 12/2014 | Matte | H05K 13/04 340/908 |
| 9,478,108 B2 | 10/2016 | Matte et al. | |
| D773,112 S | 11/2016 | Dir | |
| 9,512,969 B1 * | 12/2016 | Watson | F21V 31/00 |
| D782,717 S | 3/2017 | Dir | |
| 9,618,193 B1 * | 4/2017 | Lord | F21V 23/04 |
| D791,380 S | 7/2017 | Dir | |
| 10,084,500 B2 | 9/2018 | Davis et al. | |

(Continued)

FOREIGN PATENT DOCUMENTS

CN 218041571 U 12/2022

OTHER PUBLICATIONS

"PellKing Phone Chest Strap" https://web.archive.org/web/20220503011912/https://www.amazon.com/Mobile-Harness-Compatible-Samsung-Cameras/dp/B08R72LPNQ/ (webarchive date May 3, 2022) ("PellKing"). (Year: 2022).*
GoPro Tips: How to use Chesty, https://www.youtube.com/watch?v=bLBquQpWsd0 (Year: 2022).*

(Continued)

*Primary Examiner* — Gerald J Sufleta, II
(74) *Attorney, Agent, or Firm* — ARCHER & GREINER, P.C.; Gregory J. Winsky, Esq.

(57) ABSTRACT

An accessory for use with a body-worn camera makes use of a releasable light assembly to replace the need for a wearer of the body-worn camera to use a separately held flashlight. The light assembly may likewise include at least one, white light, as well as additional lights to enable illumination of the field being photographed or videoed by the body-worn camera, such as a red, infrared, or other low light frequencies. A blue light may be combined with the red and white lights to serve as a marker for the police or other emergency response presence, a beacon, or other similar responder functions.

11 Claims, 5 Drawing Sheets

(56) References Cited

U.S. PATENT DOCUMENTS

| | | | |
|---|---|---|---|
| 10,274,190 B2 | 4/2019 | Matte et al. | |
| D885,624 S | 5/2020 | Dir | |
| 10,677,450 B2 | 6/2020 | Matte et al. | |
| 10,910,855 B2 | 2/2021 | Doorandish | |
| 10,963,030 B2 | 3/2021 | Lee et al. | |
| 10,976,046 B2 | 4/2021 | Dir | |
| 11,397,002 B2 | 7/2022 | Dir | |
| 11,739,928 B2 | 8/2023 | Dir | |
| 12,066,178 B2 | 8/2024 | Dir | |
| 2007/0200716 A1* | 8/2007 | Haase | G08B 21/0202 340/574 |
| 2014/0285355 A1* | 9/2014 | Matte | F21V 31/005 340/815.45 |
| 2016/0072540 A1* | 3/2016 | Davis | A41D 1/002 455/575.1 |
| 2017/0023233 A1* | 1/2017 | Matte | F21V 3/049 |
| 2019/0097445 A1* | 3/2019 | Doorandish | A45F 5/021 |
| 2019/0231472 A1* | 8/2019 | Langerman | A61B 90/50 |
| 2021/0164610 A1* | 6/2021 | Roth | H04B 1/3888 |
| 2021/0360205 A1* | 11/2021 | Alakarhu | H04N 7/188 |
| 2022/0226065 A1* | 7/2022 | Hausen | A61B 90/361 |
| 2023/0199464 A1* | 6/2023 | Baldree | H04B 1/385 455/404.1 |
| 2023/0232105 A1* | 7/2023 | Hausen | G03B 17/561 348/207.99 |
| 2024/0021949 A1* | 1/2024 | Hoglund | H01M 50/262 |

OTHER PUBLICATIONS

Go Pro Light Mod ("GOL") https://web.archive.org/web/20230306175308/https://gopro.com/en/us/shop/mounts-accessories/light-mod/ALTSC-001-master.html (Year: 2022).*

ULANZI RGB Video Lights, https://web.archive.org/web/20230202204658/http://www.amazon.com/ULANZI-Photography-Redhargeable-2500-90000K-Attraction/dp/B08MDQ3CJY/ (Year: 2023).*

GoPro Light Mod Accessory In-Depth Review https://www.dcrainmaker.com/2019/12/gopro-light-accessory-review.html (Year: 2019).*

Techlife solutions Adjustable Chest Harness Mount J Hook Mount—Chest Strap Holder Compatible with All GoPro, Xiaomi Yi, SJcam and All Other Action Cameras https://amzn.eu/d/0VORk12.

Senken China Led Warning Light Factory Emergency Road Safety Rechargeable Led Road Flares Signal Warning Led Warning Light 2022, Effectual Knowledge Services Pvt. Ltd.

* cited by examiner

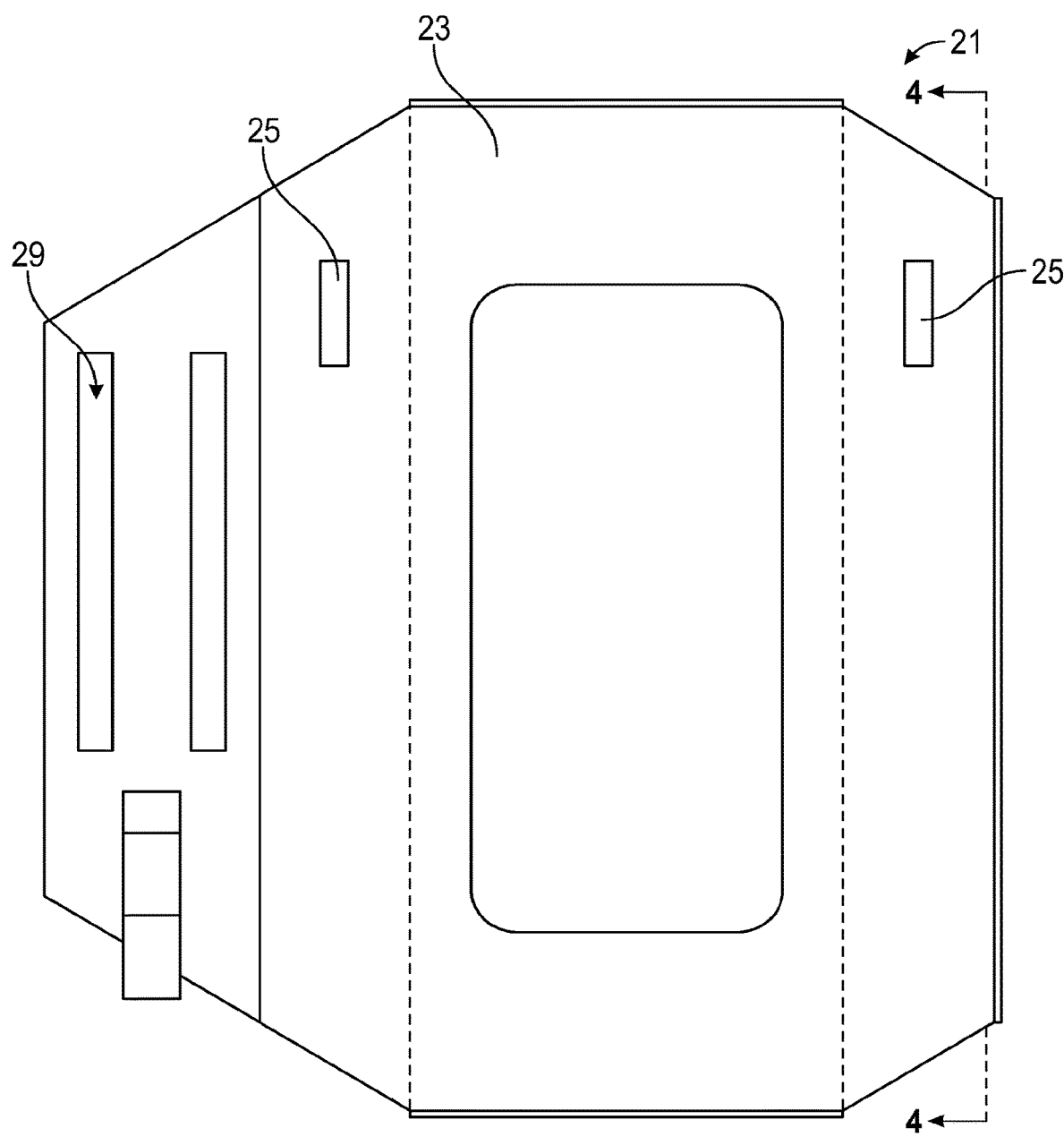

ACCESSORY FOR BODY-WORN CAMERA

CROSS REFERENCE TO RELATED APPLICATION

This application claims the benefit of U.S. Provisional Application No. 63/456,650 filed on Apr. 3, 2023.

FIELD

This disclosure relates to body-worn cameras for police, emergency responders, or similar personnel, in general, and to accessories for such body-worn cameras, in particular.

BACKGROUND

Police, emergency responders, and similar personnel may often wear video cameras in performance of their duties, referred to herein as body-worn cameras. The functionality of such body-worn cameras has limitations, drawbacks, or disadvantages in the current art.

SUMMARY

In accordance with one implementation of the present disclosure, an accessory for a body-worn camera has a mounting plate which is adapted to be secured between the body-worn camera and whatever attachment mechanism normally secures such body-worn camera to the police officer or other emergency personnel. The mounting plate has a portion which extends from behind the body-worn camera to a location adjacent to it so that a light assembly can be releasably mounted to the mounting plate next to the body-worn camera. The light assembly has at least one light associated with it, such as a white light, sufficiently strong to obviate the need for the officer to hold a separate flashlight in one of his or her hands. The white light is oriented to correspond to the field of vision of the body-worn camera.

In another implementation, the light assembly may include three lights, the white light mentioned previously to function as a replacement for a handheld flashlight, but also a red light and a blue light. The red light may be actuated for low-light situations, or the red light in combination with the white and blue lights may be selectively actuated in series or simultaneously to operate as a beacon, marker, or other warning lights in emergency situations.

BRIEF DESCRIPTION OF DRAWINGS

FIG. 2 is a top elevational view of a component of the accessory of the implementation of FIG. 1, taken along line 2-2;

FIG. 3 is a front elevational view of the component of the accessory of FIG. 2, taken along line 3-3 of FIG. 1;

DETAILED DESCRIPTION

FIGS. 1-9 show one possible implementation of a body-worn camera ("BWC") system 19. BWC system 19 includes the body-worn camera itself, labeled 40 in FIG. 1, and one or more accessories 20 to enhance functionality of BWC system 19 beyond typical video recording by the BWC. Accessory 20, in this implementation, may eliminate or reduce the need for an officer or other personnel to hold a flashlight in his or her hand during low-light situations.

Figure 1:
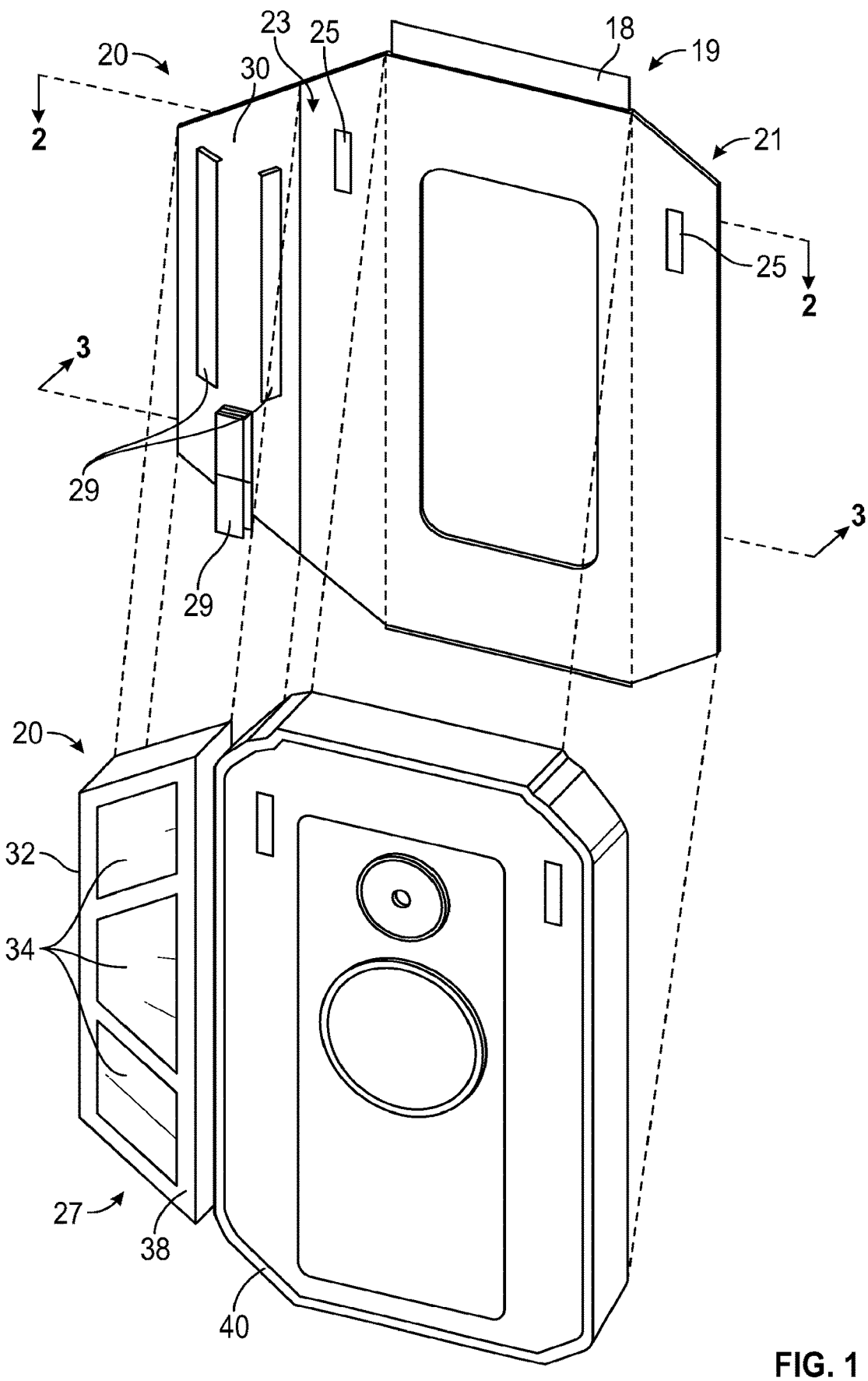
FIG. 1 is an exploded, perspective view of one implementation of a body-worn camera system of the present disclosure, showing a body-worn camera and an accessory thereto.

As such, accessories 20 include a mounting plate 21 configured to be disposed or sandwiched between the body-worn camera 40 in FIG. 1, and the clip, plate, or other mechanism for attachment 18 normally used to attach the body-worn camera to the officer or other personnel, often through or in association with such personnel's shirt, vest, or other clothing being worn on the chest.

Accessory 20 likewise may include a light assembly 27 as shown in FIG. 1. Mounting plate 21 is configured to have a tab 30 extending laterally therefrom to removably receive light assembly 27, as best seen in FIG. 1.

Figure 4:
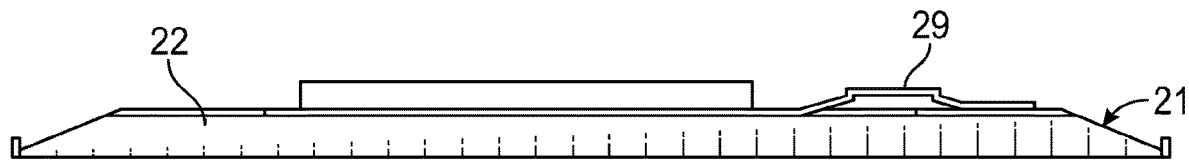
FIG. 4 is a side elevational view of the component of the present implementation of FIGS. 2 and 3, taken along line 4-4 of FIG. 3.

In one suitable implementation as shown in FIG. 1 and in its top, front, and side elevations as shown in FIGS. 2, 3, and 4 respectively, a mounting plate 21 and light assembly 27 are configured to be used or connected to existing or standalone BWCs and their existing attachments or clips such as 18 as shown in FIG. 1, so as to create BWC system 19. Accordingly, accessory 20, including mounting plate 21 and light accessory 27, may be dimensioned, configured, or otherwise adapted to attach to and work in conjunction with BWCs, such as 40 in FIG. 1, currently being used without such accessory 20.

In this implementation, mounting plate 21 is configured to have a contoured region of three, planar areas, including a base plate and two, outer areas sloped or curved inwardly to form a concavity 23. Concavity 23 may serve as a cradle and may be configured to follow the contour of the rear surface of BWC 40 with which accessory 21 is being associated. Rear surface of mounting plate 21 roughly follows the forward, concave contour of front surface of mounting plate 21, such that mounting plate is substantially planar. As such, concavity 23 is thus shaped to permit mounting plate 21 to be readily inserted or sandwiched between BWC 40 and whatever clip or attachment mechanism 18 is normally associated with BWC 40, and worn by the officer or other personnel on his or her chest.

In the illustrated implementation in FIGS. 1 and 3, mounting plate 21 includes engagement slots 25 which engage with corresponding elements on the rear surface of BWC 40. It will be appreciated that any number of fasteners or interconnections can be fashioned to releasably mount any BWC to the forward-facing surface of mounting plate 21, and the front face of mounting plate 21 need not necessarily be in the form of a concavity 23.

Figure 5:
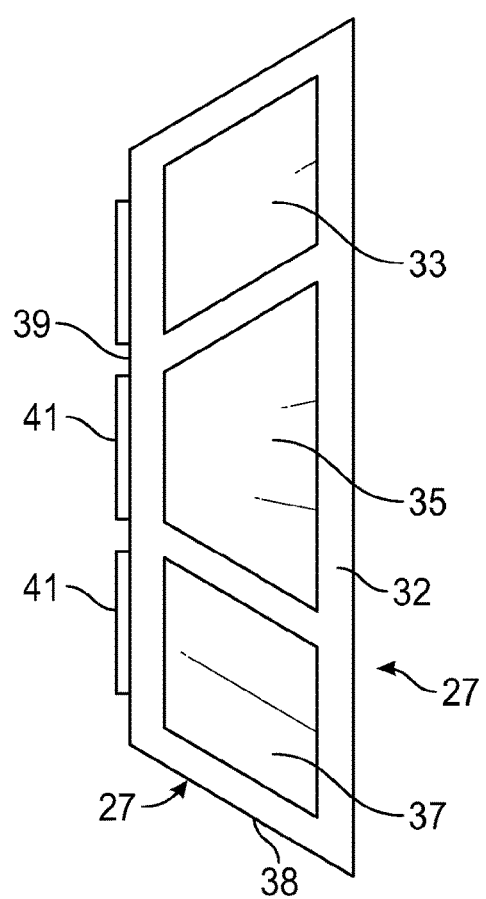
FIG. 5 is a front elevational view of a light accessory component of the body-worn camera system of FIG. 1.
Figure 6:
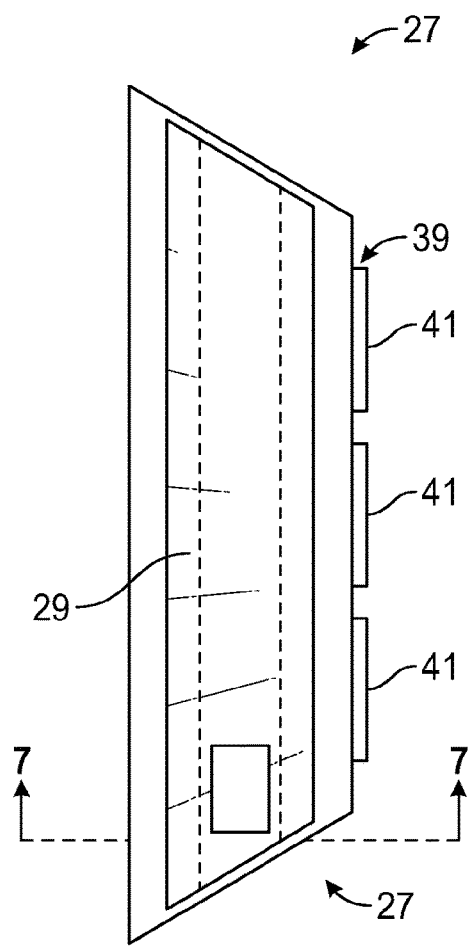
FIG. 6 is a rear elevational view of the light accessory of FIGS. 1 and 5.
Figure 7:
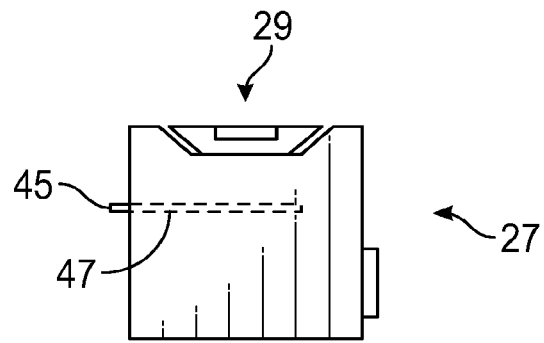
FIG. 7 is a bottom elevational view of the light accessory of FIGS. 1, 5, and 6, with an additional attachment feature shown therein.

Accessory 20 as shown in FIG. 1 includes a light assembly 27, as shown in its front, rear, and bottom elevations in FIGS. 5, 6, and 7 respectively, releasably securable to a laterally extending portion 30 of mounting plate 21. Any suitable attachment mechanism may be used to removably secure light assembly 27 to mounting plate 21. In the illustrated implementation of FIGS. 1 and 2, the releasable attachment is shown schematically by reference 29 and may comprise a rail slide method, such as that known as the picatinny rail, but other releasable attachment mechanisms are likewise suitable, such as key and slot arrangements on opposing surfaces of portion 30 and the rear surface of light assembly 27.

In one suitable implementation shown in FIG. 1, and FIGS. 5,6, and 7, the size, shape, footprint, or profile of light assembly 27 is selected to achieve ergonomic objectives appropriate for police or other emergency responders engaged in emergency or other activities. So, for example, light assembly 27 in FIG. 1 has a depth selected so its front surface 32 is coplanar with corresponding front surface of BWC 40. Similarly, lower edge 38 of light accessory 27 is oriented and located to be coplanar with inclined side edge 40 of the illustrated BWC 40. Such geometries avoid impairment of officer operations and minimize inadvertent dislodging or contact with light accessory 27.

FIG. 1 shows light accessory 27 that includes three light sources 34, including, as shown in FIG. 5 as red light 33, white light 35, and blue light 37.

Light accessory 27 as shown in FIGS. 5 and 6 includes suitable electrical or operative programmed connections between a finger pad 39 and three corresponding buttons 41 thereon, on the one hand, and light sources 34, on the other hand. Finger pad 39 and corresponding buttons 41 are ergonomically located such that, when light accessory 27 is secured to mounting plate 21, finger pad 39 is located on the outer lateral side of BWC system 19. Functions associated with the finger pad 39, its buttons 41, and light sources 34 include, in this implementation, an independent white light option corresponding to pushing one of the buttons 41, and similarly dedicated connections between the blue and red lights, 37 and 33 respectively, and a corresponding one of buttons 41, respectively.

In addition, any number of strobing options involving individual, combined, or sequential activation of lights, and any number of suitable variations thereto, are within the scope of this disclosure. So, for example, in one suitable implementation, the primary, white light 35 may be activated to remain on in response to pressing the corresponding button, thus replacing the need to use a handheld flashlight, and thus freeing such hand for the officer or other emergency responder to conduct activities in a field of view illuminated by the constant white light 35. Such white light may be activated by a quick, single press of whatever button is proximate to or aligned with white light 35, in this case, the central one of buttons 41. Similarly, a quick single press of a button 41 aligned with red light 33 would allow illumination when low light or other less noticeable mode is required or optimal. Thirdly, to strobe red, white, and blue lights together or sequentially, such as in a situation where police or emergency responder presence is to be indicated to passing traffic or other bystanders, a button 41 adjacent to blue light 37 could be activated by a double-quick press. Again, other combinations and activation means are within the scope of the present disclosure.

Another feature of light accessory 27 is sealing its housing against harsh environmental conditions to which light accessory 27 may be exposed, including water resistance. Similarly, finger pad 39 may be configured so as to be operated through gloved hands or otherwise in harsh conditions, may include traction grip buttons, or may be otherwise configured to minimize entrance of debris into the unit through button or finger pad 39.

Since light assembly 27 is selectively removable as explained previously, light assembly 27 may include suitable magnetic portions, such as on its back surface 29 as shown in FIG. 6, opposite light sources 34. As such, light assembly 27 may be separated from its mounting plate 21 and mounted to a metallic surface independently of mounting plate 21, to serve as a beacon, locator, illumination in otherwise darkened areas, and the like. Such independent use of light assembly 27 thus permits the officer or other emergency responder to tag, mark, indicate, or illuminate objects regardless of the orientation of the remaining portions of BWC system 19.

Figure 8:
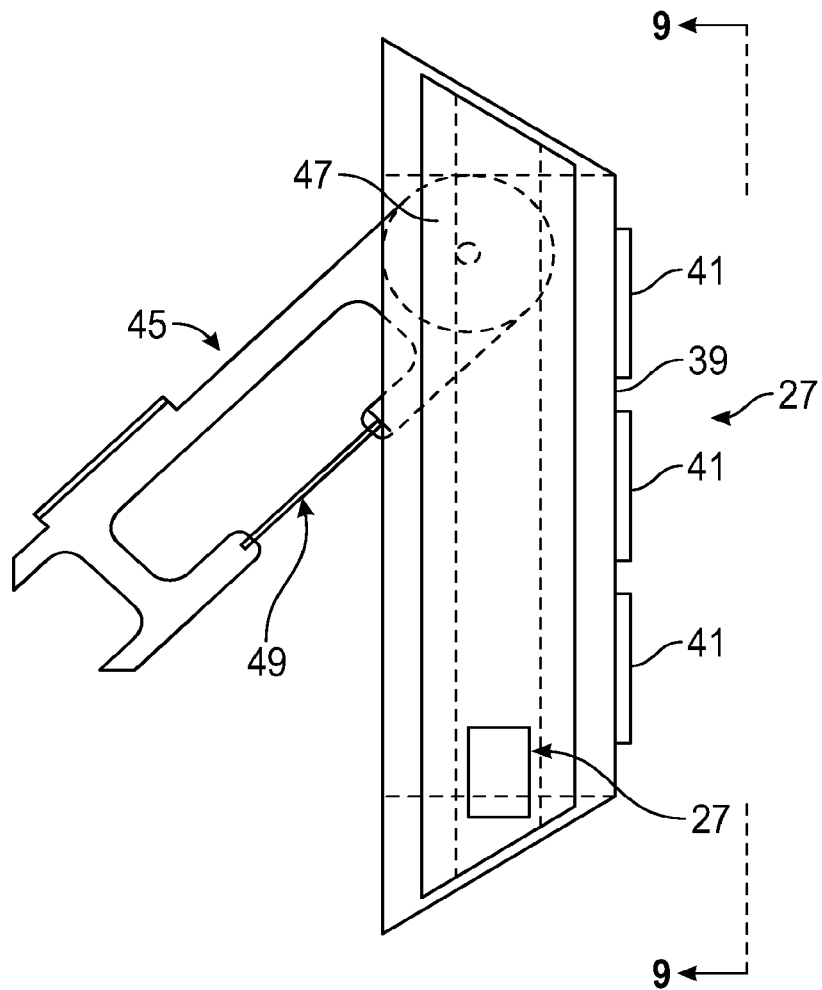
FIG. 8 is a rear view of a light accessory according to another implementation of the present disclosure, showing an associated attachment feature for such light accessory.
Figure 9:
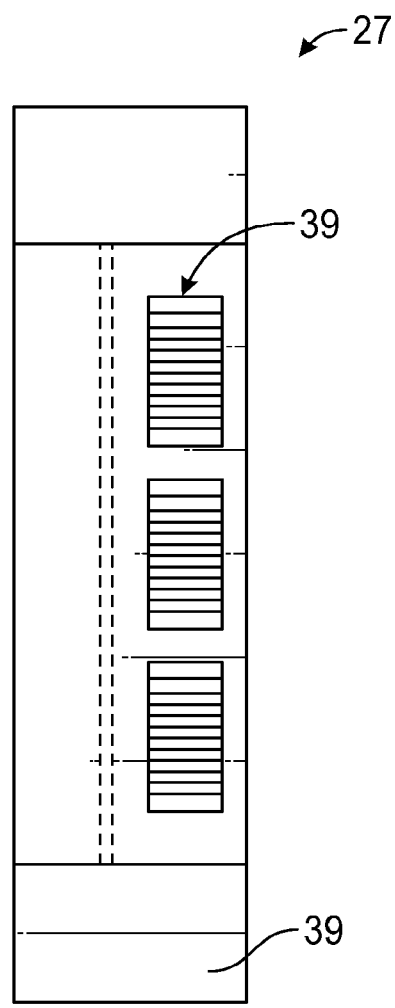
FIG. 9 is a side elevational view of the light accessory of FIGS. 7-8 taken along line 9-9 of FIG. 8.

Light assembly 27 may, in certain implementations, include a mechanical attachment mechanism which does not require magnetic material. In this implementation as shown in FIG. 8, a forked or pronged assembly 45 may be secured in an area of light assembly 27, such as a slot 47. Pronged assembly 45 may then be rotatably secured within slot 47 so that it can be deployed outwardly from said slot 47 and its prongs being driven into a surface to temporarily secure light assembly 27 relatively thereto. In other words, the prongs of pronged assembly 45 may engage the ground, drywall, or other surfaces, in response to application of force by the officer. Pronged assembly may likewise have a carabiner feature associated therewith such that light assembly 27 may be looped around a branch or similar item. Accordingly, once driven into an opposing surface or looped around a branch, light assembly 27 may serve as a beacon or otherwise illuminate an area leaving the officer's hands free.

Other implementations of accessory 20 and BWC system 19 are contemplated by this disclosure.

What is claimed is:

1. An accessory for use with a camera and an associated mechanism for attachment of said camera to clothing worn on the chest of a user, the accessory comprising:
   a mounting plate to be sandwiched between said camera and said associated mechanism configured to have a contoured region of three planar areas curved inwardly to form a concavity and having engagement slots that engage with corresponding elements on the rear surface of said camera that facilitate said sandwiching;
   and a light assembly having at least one user-actuatable light source located thereon,
   said light assembly having a user-actuatable light source activation mechanism,
   and said mounting plate having an attachment mechanism to which said light assembly is directly and releasably secured;
   whereby said at least one user-actuatable light source is oriented to illuminate an area in the direction of the photographic field of said camera.

2. The accessory of claim 1, wherein said at least one user-actuatable light source is a white light.

3. The accessory of claim 2, wherein said user-actuatable light source further comprises a user-actuatable red light source and a user-actuatable blue light source, said light sources being user-actuatable individually or in combinations depending on desired functioning of said light assembly.

4. The accessory of claim 3, wherein said user-actuatable light source is operable as a strobe light.

5. The accessory of claim 1, wherein said user is selected from the group comprised of: police, fire fighters, and emergency medical technicians.

6. The accessory of claim 1, wherein said light assembly is water resistant.

7. The accessory of claim 1, wherein said attachment mechanism is selected from the group comprised of: a releasable magnetic mechanism, a releasable rail slide mechanism, a releasable key and slot mechanism, and a releasable pronged mechanism.

8. The accessory of claim 1, wherein said user actuatable light source activation mechanism comprises a finger pad.

9. The accessory of claim 8, wherein said finger pad is configured to be operable by said user wearing gloves.

10. The accessory of claim 8, wherein said finger pad is configured to minimize entrance of debris into said activation mechanism.

11. The accessory of claim 1, wherein said light assembly includes a slot in which a pronged assembly is rotatably secured.

\* \* \* \* \*